(12) United States Patent
Nishita et al.

(10) Patent No.: US 11,385,052 B2
(45) Date of Patent: Jul. 12, 2022

(54) SURVEYING INSTRUMENT

(71) Applicant: TOPCON Corporation, Tokyo-to (JP)

(72) Inventors: Nobuyuki Nishita, Tokyo-to (JP); Fumio Ohtomo, Saitama (JP)

(73) Assignee: TOPCON Corporation, Tokyo-to (JP)

( * ) Notice: Subject to any disclaimer, the term of this patent is extended or adjusted under 35 U.S.C. 154(b) by 331 days.

(21) Appl. No.: 16/844,210

(22) Filed: Apr. 9, 2020

(65) Prior Publication Data
US 2020/0326186 A1 Oct. 15, 2020

(30) Foreign Application Priority Data
Apr. 15, 2019 (JP) .............................. JP2019-076803

(51) Int. Cl.
*G01C 3/02* (2006.01)
*G01B 21/22* (2006.01)
*G01C 15/14* (2006.01)
*G01C 3/10* (2006.01)

(52) U.S. Cl.
CPC .............. *G01C 3/02* (2013.01); *G01B 21/22* (2013.01); *G01C 3/10* (2013.01); *G01C 15/14* (2013.01)

(58) Field of Classification Search
None
See application file for complete search history.

(56) References Cited

U.S. PATENT DOCUMENTS

| | | | | |
|---|---|---|---|---|
| 3,936,197 A | * | 2/1976 | Aldrink | G01C 15/004 356/399 |
| 8,881,412 B2 | * | 11/2014 | Nishita | G01C 15/008 33/290 |
| 10,520,307 B2 | * | 12/2019 | Ohtomo | G01S 17/86 |
| 10,753,740 B2 | * | 8/2020 | Kotzur | G01C 15/008 |
| 10,809,360 B2 | * | 10/2020 | Ohtomo | G01S 17/89 |
| 10,823,558 B2 | * | 11/2020 | Ohtomo | G01C 1/02 |
| 11,009,607 B2 | * | 5/2021 | Nishita | G01C 3/08 |
| 2014/0300886 A1 | * | 10/2014 | Zogg | G01S 7/4817 356/4.01 |
| 2015/0052765 A1 | * | 2/2015 | Kumagai | G01C 15/002 33/290 |
| 2016/0238708 A1 | | 8/2016 | Ohtomo et al. | |
| 2017/0168142 A1 | | 6/2017 | Kumagai et al. | |

(Continued)

FOREIGN PATENT DOCUMENTS

JP 2016-151423 A 8/2016
JP 2017-106813 A 6/2017

*Primary Examiner* — Christopher W Fulton
(74) *Attorney, Agent, or Firm* — Nields, Lemack & Frame, LLC.

(57) ABSTRACT

There is provided a surveying instrument including a tripod which is installed on an installation surface and a surveying instrument main body which is provided on the tripod and laterally rotatable around a longitudinal axis, wherein the tripod includes a reference leg has a known relationship between a lower end of the reference leg and a machine reference point which is a machine center of the surveying instrument main body, and two auxiliary legs, the reference leg is installed in such a manner that a lower end of the reference leg coincides with a reference point, wherein the surveying instrument main body calculates a position of the machine reference point with respect to the reference point based on the positional relationship between the lower end of the reference leg and the machine reference point.

15 Claims, 5 Drawing Sheets

(56) References Cited

U.S. PATENT DOCUMENTS

| | | | |
|---|---|---|---|
| 2019/0360806 A1* | 11/2019 | Ohtomo | G01C 15/06 |
| 2020/0348133 A1* | 11/2020 | Eisenreich | G01C 15/006 |
| 2021/0033394 A1* | 2/2021 | Sasaki | G01C 3/06 |
| 2022/0011105 A1* | 1/2022 | Hotz | G01C 15/002 |

* cited by examiner

SURVEYING INSTRUMENT

BACKGROUND OF THE INVENTION

The present invention relates to a surveying instrument which can be easily installed.

In case of performing a survey using a surveying instrument, the surveying instrument must be first installed on a reference point which becomes a reference for the survey.

Generally, in case of installing the surveying instrument on the reference point, the surveying instrument is installed by using a tripod. Conventionally, a machine center of the surveying instrument must be accurately positioned on a vertical line running through the reference point, and then the surveying instrument must be horizontally leveled up by using a leveling device.

Further, for instance, a point having the known three-dimensional coordinates must be measured by the surveying instrument so that a height from the reference point to the machine center (a machine height of the surveying instrument) can be measured. For this reason, a surveying instrument installation work is complicated and requires a time and a skill.

SUMMARY OF INVENTION

It is an object of the present invention to provide a surveying instrument which can be easily installed in a short time.

To attain the object as a described above, a surveying instrument according to the present invention includes a tripod which is installed on an installation surface and a surveying instrument main body which is provided on the tripod and laterally rotatable around a longitudinal axis, wherein the tripod includes a base module, a reference leg which is integral with the base module and has a known relationship between a lower end of the reference leg and a machine reference point which is a machine center of the surveying instrument main body, and two auxiliary legs, wherein the surveying instrument main body includes a distance measuring module configured to measure a distance to an object to be measured, a lateral rotation angle detector configured to detect a lateral rotation angle of the surveying instrument main body, and an arithmetic control module, the reference leg is installed in such a manner that a lower end of the reference leg coincides with a reference point, and the arithmetic control module configured to calculate a position of the machine reference point with respect to the reference point based on the positional relationship between the lower end of the reference leg and the machine reference point.

Further, in the surveying instrument according to a preferred embodiment, the auxiliary legs are tiltable or expansible/contractible with respect to the base module.

Further, in the surveying instrument according to a preferred embodiment, an arbitrary reference direction is configured to set to the surveying instrument main body, and a tilt direction of the reference leg with respect to the reference direction and a tilt angle of the reference leg with respect to the longitudinal axis are known.

Further, in the surveying instrument according to a preferred embodiment, the surveying instrument main body further comprises an attitude detector, and the arithmetic control module configured to correct a position of the machine reference point with respect to the reference point based on a detection result of the attitude detector.

Further, in the surveying instrument according to a preferred embodiment, the reference leg comprises a rod-like leg portion, a holding portion which slidably holds the leg portion, and a fixing portion which fixes the leg portion to the holding portion at a predetermined position, a reference line is formed on the leg portion, the scale are formed on the holding portion at the predetermined intervals, and a length of the reference leg when the reference line coincides with each scale is known.

Further, in the surveying instrument according to a preferred embodiment, the reference leg is tiltable in a radial direction with a base end portion as a center and fixable at a predetermined tilt angle with respect to the base module.

Further, in the surveying instrument according to a preferred embodiment, the distance measuring module is longitudinally rotatable around a lateral axis, and the surveying instrument main body further comprises a longitudinal rotation angle detector (21) configured to detect a longitudinal rotation angle of the distance measuring module.

Furthermore, in the surveying instrument according to a preferred embodiment, the arithmetic control module configured to convert a lateral rotation angle detected by the lateral rotation angle detector and a longitudinal rotation angle detected by the longitudinal rotation angle detector into a horizontal angle and a vertical angle based on a detection result of the attitude detector, respectively.

According to the present invention, the surveying instrument including a tripod which is installed on an installation surface and a surveying instrument main body which is provided on the tripod and laterally rotatable around a longitudinal axis, wherein the tripod includes a base module, a reference leg which is integral with the base module and has a known relationship between a lower end of the reference leg and a machine reference point which is a machine center of the surveying instrument main body, and two auxiliary legs, wherein the surveying instrument main body includes a distance measuring module configured to measure a distance to an object to be measured, a lateral rotation angle detector configured to detect a lateral rotation angle of the surveying instrument main body, and an arithmetic control module, the reference leg is installed in such a manner that a lower end of the reference leg coincides with a reference point, and the arithmetic control module configured to calculate a position of the machine reference point with respect to the reference point based on the positional relationship between the lower end of the reference leg and the machine reference point. As a result, performing the installation in such a manner that the lower end of the reference leg can coincide with the reference point can suffice at the time of the installation work, and the installation work can be easily carried out in a short time.

DETAILED DESCRIPTION OF THE PREFERRED EMBODIMENTS

A description will be given on an embodiment of the present invention by referring to the attached drawings.

Figure 1:
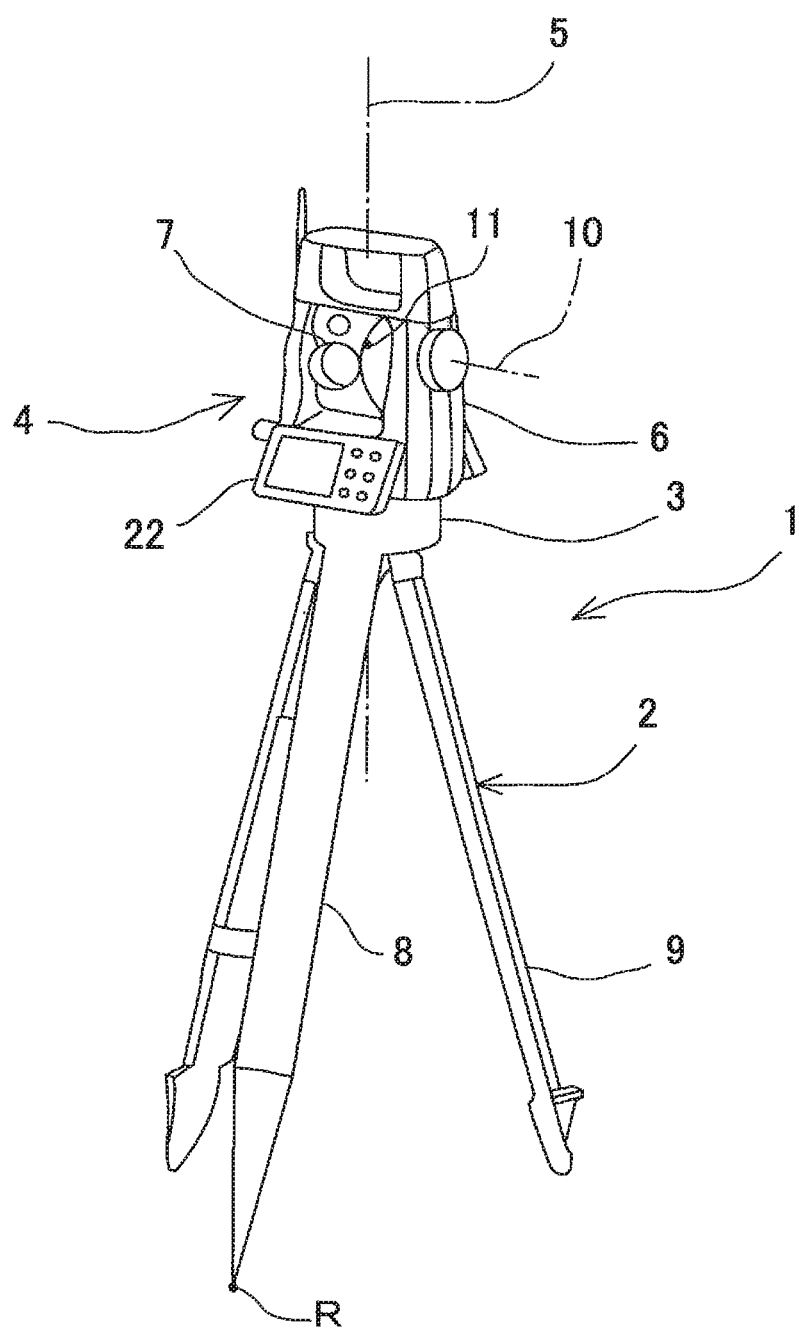
FIG. 1 is a perspective view showing a surveying instrument according to a first embodiment of the present invention.
Figure 2:
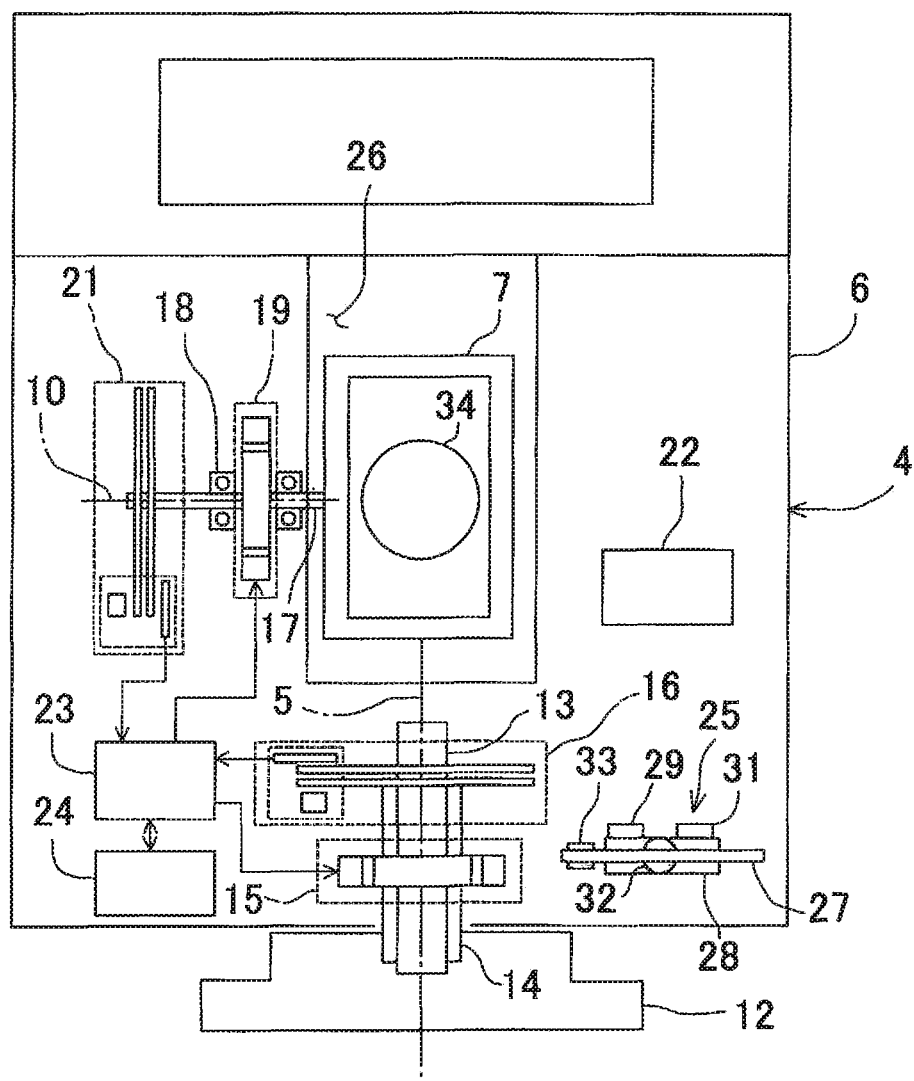
FIG. 2 is a front view showing an example of a surveying instrument main body according to the first embodiment of the present invention.

First, in FIG. 1 and FIG. 2, a surveying instrument according to a first embodiment of the present invention will be described.

A surveying instrument 1 is a total station, for instance. The surveying instrument 1 has mainly a tripod 2, a base module 3 provided the tripod 2, and a surveying instrument main body 4 provided on the base portion 3. The surveying instrument main body 4 is mainly constituted of a frame unit 6 provided to the base module 3 so that it can laterally rotate around a longitudinal axis 5 and a telescope module 7 provided to the frame unit 6 so that it can longitudinally rotate around a lateral axis 10.

Further, the tripod 2 is constituted of a reference leg 8 integrally molded with the base module 3 and two auxiliary legs 9 provided with respect to the base module 3 so that it can rotate (tilt) around a base end portion at a predetermined angle. A lower end of the reference leg 8 has a sharp tip, and the tripod 2 is installed in such a manner that the lower end of the reference leg 8 coincides with a reference point R. It is to be noted that the auxiliary legs 9 may be expansible or contractible with respect to the base module 3.

A machine reference point 11 which is a machine center of the surveying instrument main body 4 and also a reference position of the distance measuring light is placed on the longitudinal axis 5. A positional relationship (a distance) between the lower end of the reference leg 8 and the machine reference point 11 is known. That is, when an arbitrary direction is set as a reference direction of the surveying instrument 1, a tilt direction of the reference leg 8 with respect to the reference direction, a tilt angle of the reference leg 8 with respect to the longitudinal axis 5, and the distance between the lower end of the reference leg 8 and the machine reference point 11 are known. Therefore, irrespective of an attitude and a direction of the surveying instrument 1, a position of the lower end of the reference leg 8 with respect to the machine reference point 11 is known, and the distance between the machine reference point 11 and the lower end of the reference leg 8 is always fixed.

The surveying instrument main body 4 includes a fixing portion 12 fixed to the base module 3, the frame unit 6, a lateral rotation shaft 13, a lateral rotation bearing 14, a lateral rotation motor 15 as a lateral rotation driving module, a lateral rotation angle encoder 16 as a lateral rotation angle detector, a longitudinal rotation shaft 17, a longitudinal rotation bearing 18, a longitudinal rotation motor 19 as a longitudinal rotation driving module, a longitudinal rotation angle encoder 21 as a longitudinal rotation angle detector, an operation panel 22 configured to input the measurement conditions, the instructions and the like, an arithmetic control module 23, a storage module 24, an attitude detector 25, and the like.

The lateral rotation bearing 14 is fixed to the fixing portion 12. The lateral rotation shaft 13 has the longitudinal axis 5, and is rotatably supported by the lateral rotation bearing 14. Further, the frame unit 6 is supported by the lateral rotation shaft 13, and the frame unit 6 rotates in a lateral direction together with the lateral rotation shaft 13.

The lateral rotation motor 15 is provided between the lateral rotation bearing 14 and the frame unit 6, and the lateral rotation motor 15 is controlled by the arithmetic control module 23. The arithmetic control module 23 rotates the frame unit 6 around the longitudinal axis 5 by the lateral rotation motor 15.

It is to be noted that the lateral rotation angle encoder 16 may be replaced by an image pickup device or an IMU (an inertial sensor) having a gyro sensor integrated with an acceleration sensor. That is, the lateral rotation angle encoder 16 could be a device which can acquire an angle of a lateral rotation around the longitudinal axis 5.

A relative rotation angle of the frame unit 6 with respect to the fixing portion 12 is detected by the lateral rotation angle encoder 16. For instance, a predetermined direction is set as a reference direction, and a lateral rotation angle with respect to the reference direction is detected by the lateral rotation angle encoder 16. A detection signal from the lateral rotation angle encoder 16 is input to the arithmetic control module 23, and the lateral rotation angle data is calculated by the arithmetic control module 23. The arithmetic control module 23 performs a feedback control with respect to the lateral rotation motor 15 based on the lateral rotation angle data.

Further, a recessed portion 26 is formed in the frame unit 6. The longitudinal rotation shaft 17 is rotatably provided to the frame unit 6 via the longitudinal rotation bearing 18.

The longitudinal rotation shaft 17 has the lateral axis 10, and one end portion of the longitudinal rotation shaft 17 extends into the recessed portion 26. The telescope module 7 is fixed to the one end portion of the longitudinal rotation shaft 17, and the telescope module 7 is accommodated in the recessed portion 26. Further, the longitudinal rotation angle encoder 21 is provided to the other end portion of the longitudinal rotation shaft 17. A reference position of the distance measuring light (the machine reference point 11) is, for instance, an intersection of the longitudinal axis 5 and the lateral axis 10, and also an origin of a coordinate system of the surveying instrument 1.

The longitudinal rotation motor 19 is provided to the longitudinal rotation shaft 17, and the longitudinal rotation motor 19 is controlled by the arithmetic control module 23. The arithmetic control module 23 rotates the longitudinal rotation shaft 17 by the longitudinal rotation motor 19, and the telescope module 7 is rotated around the lateral axis 10.

An angle of elevation (a longitudinal rotation angle) of the telescope module 7 is detected by the longitudinal rotation angle encoder 21, and a detection result is input to the arithmetic control module 23. The arithmetic control module 23 calculates the longitudinal rotation angle data of the telescope module 7 based on a detection result of the longitudinal rotation angle encoder 21. Further, the arithmetic control module 23 performs the feedback control with respect to the longitudinal rotation motor 19 based on the longitudinal rotation angle data.

Further, the lateral rotation angle data, the longitudinal rotation angle data, the measurement results, the detection results of a first tilt sensor 29 and a second tilt sensor 31 (to be described later), a preset arbitrary reference direction and the like calculated by the arithmetic control module 23 are stored in the storage module 24. It is to be noted that, as the arithmetic control module 23, a CPU specialized for this instrument or a general-purpose CPU is used.

As the storage module 24, the various types of storage devices are used. These storage devices include: an HDD as a magnetic storage device, a CD and DVD as an optical storage device, and a memory card and a USB as a semiconductor storage device and other storage devices are used. The storage module 24 may be attachable or detachable with respect to the frame unit 6. Alternatively, the storage module 24 may enable transmitting the data to an external storage device or an external data processing device via a desired communicating means.

Further, in the storage module 24, various types of programs are stored. These programs include: a sequence program for controlling a distance measuring operation, a calculation program for calculating a distance by the distance measuring operation and a calculation program for calculating an attitude. Further, by the various types of programs are executed by the arithmetic control module 23, the various types of processing are executed.

Next, a description will be given on the attitude detector 25. The attitude detector 25 detects a tilt angle with respect to the horizontal or the vertical of the surveying instrument main body 4, and a detection result is inputted to the arithmetic control module 23. It is to be noted that, as the attitude detector 25, an attitude detector disclosed in Japanese Patent Application Publication No. 2016-151423 can be used.

The attitude detector 25 will be described in brief. The attitude detector 25 has a frame 27. The frame 27 is fixed to the frame unit 6 or fixed to a structural component, and is integrated with the surveying instrument main body 4.

A sensor block 28 is mounted on the frame 27 via a gimbal. The sensor block 28 is rotatable by 360° or over 360° in two directions around two axes crossing each other at a right angle, respectively.

The first tilt sensor 29 and the second tilt sensor 31 are mounted on the sensor block 28. The first tilt sensor 29 is a sensor which detects the horizontal with high accuracy, for instance, a tilt detector which makes the detection light enter a horizontal liquid surface, and detects the horizontal according to a change of a reflection angle of the reflected light or an air bubble tube which detects a tilt according to a positional change of a sealed air bubble. Further, the second tilt sensor 31 is a sensor which detects a tilt change with the high responsiveness, for instance, an acceleration sensor.

Each relative rotation angle of the two axes of the sensor block 28 with respect to the frame 27 are configured to be detected by encoders 32 and 33, respectively.

Further, motors (not shown) which rotate the sensor block 28 in order to maintain the sensor block 28 horizontally are provided in relation with the two axes, respectively. The motors are controlled by the arithmetic control module 23 so that the sensor block 28 is maintained horizontally based on the detection results from the first tilt sensor 29 and the second tilt sensor 31.

In a case where the sensor block 28 tilted with respect to the frame 27 (in a case where the surveying instrument main body 4 is tilted), the relative rotation angle of each axial direction of the frame 27 with respect to the sensor block 28 (horizontal) is detected by the encoders 32 and 33, respectively. Based on the detection results of the encoders 32 and 33, the tilt angles of the surveying instrument main body 4 in the two axes with respect to the horizontal are detected, and a tilting direction of the surveying instrument main body 4 is detected by the synthesizing the tilts of the two axes.

Since the sensor block 28 can rotatable by 360° or over 360° with respect to the two axes, whatever the attitude detector 25 takes any attitude or even if the attitude detector 25 is inverted upside down, for instance, the attitude detector 25 is capable of an attitude detection (the tilt angle and the tilt direction with respect to the horizontal) in all the directions.

In the attitude detection, in a case where the high responsiveness is required, the attitude detection and the attitude control are performed based on the detection result of the second tilt sensor 31, but the second tilt sensor 31 has a detection accuracy poorer than that of the first tilt sensor 29 in general.

The attitude detector 25 includes the first tilt sensor 29 with high accuracy and the second tilt sensor 31 with high responsiveness. Thereby, it is possible to perform the attitude control based on the detection result of the second tilt sensor 31 and further, to perform the attitude detection with high accuracy by the first tilt sensor 29 in real time.

The detection result of the second tilt sensor 31 can be calibrated in real time based on the detection result of the first tilt sensor 29. That is, if a deviation is caused between values of the encoders 32 and 33 of when the first tilt sensor 29 detects the horizontal, that is, an actual tilt angle and a tilt angle detected by the second tilt sensor 31, the tilt angle of the second tilt sensor 31 can be calibrated based on the deviation.

Therefore, if the relationship between a tilt angle detected by the second tilt sensor 31 and a tilt angle, which is obtained based on the horizontal detection by the first tilt sensor 29 and the detection results of the encoders 32 and 33, is obtained in advance, the arithmetic control module 23 can calibrate the tilt angle detected by the second tilt sensor 31, and an accuracy of the attitude detection with high responsiveness by the second tilt sensor 31 can be improved based on this calibration. In a state where there is a small environmental change (a temperature or the like), the tilt detection may be performed based on the detection result of the second tilt sensor 31 and a correction value.

The arithmetic control module 23 controls the motors based on the signal from the second tilt sensor 31 when a tilt fluctuation is large and when the tilt change is rapid. Further, the arithmetic control module 23 controls the motors based on a signal from the first tilt sensor 29 when the tilt fluctuation is small and when the tilt change is mild, that is, in a case where the first tilt sensor 29 is capable of following up. It is to be noted that, by calibrating the tilt angle detected by the second tilt sensor 31 at all time, the attitude detection by the attitude detector 25 may be performed based on the detection result from the second tilt sensor 31.

It is to be noted that, in the storage module 24, the comparison data indicating a comparison result between the detection results of the first tilt sensor 29 and the detection results of the second tilt sensor 31 is stored. The detection result by the second tilt sensor 31 is calibrated based on the signal from the first tilt sensor 29. By this calibration, the detection results by the second tilt sensor 31 can be improve to the detection accuracy of the first tilt sensor 29. Thus, in the attitude detection by the attitude detector 25, high responsiveness can be realized while high accuracy maintained and the attitude detection with high accuracy can be realized in real time.

The telescope module 7 will be described.

The telescope module 7 includes a sighting telescope 34, and incorporates a distance measuring module. The distance measuring module has a distance measuring light projecting module (not shown) which projects the distance measuring light in a direction orthogonal with respect to the lateral axis 10 and a distance measuring light receiving module (not shown) which receives the reflected distance measuring light reflected by an object to be measured. It is to be noted that a distance measuring optical axis of the distance measuring light coincides with a sighting optical axis of the sighting telescope 34.

The distance measurement of the object to be measured is performed by the distance measuring module based on a time difference between a light emission timing of the distance measuring light projected from the distance measuring light projecting module and a light receiving timing of the reflected distance measuring light reflected by the object to be measured with respect to the distance measuring light receiving module (that is, a round-trip time of the distance measuring light) and a light velocity. A distance measurement result is associated with a detection result of the attitude detector 25, the lateral rotation angle data, and the longitudinal rotation angle data, and stored in the storage module 24.

At the time of performing the measurement by the surveying instrument 1, the auxiliary legs 9 are first spread, and the surveying instrument 1 is installed in such a manner that the lower end of the reference leg 8 coincides with the reference point R having the three-dimensional coordinates.

When the surveying instrument 1 has been installed, the arithmetic control module 23 rotates the frame unit 6 in the lateral direction by the lateral rotation motor 15, and rotates the telescope module 7 in the longitudinal rotation by the longitudinal rotation motor 19, and performs the sighting and the distance measurement of a predetermined object to be measured.

At this time, a tilt direction of the reference leg 8 with respect to a reference direction of the surveying instrument main body 4 and a tilt angle of the reference leg 8 with respect to the longitudinal axis 5 are known.

Therefore, the arithmetic control module 23 calculates a direction of the surveying instrument main body 4 with respect to the reference direction based on the lateral rotation angle data and the longitudinal rotation angle data in the distance measurement, and calculates a position (the three-dimensional coordinates) of the machine reference point 11 with respect to the reference point R based on the calculated direction.

Further, the arithmetic control module 23 corrects the three-dimensional coordinates of the machine reference point 11 based on a detection result of the attitude detector 25 in the distance measurement, and converts the lateral rotation angle data and the longitudinal rotation angle data into the horizontal angle data and the vertical angle data. Further, the arithmetic control module 23 calculates the three-dimensional coordinates of the object to be measured in a coordinate system of the reference point R based on a distance measurement result, the horizontal angle data, the vertical angle data, and a position of the machine reference point 11 with respect to the reference point R.

As described above, in the first embodiment, one leg of the tripod 2 provided to the base module 3 is the reference leg 8 integrated with the base module 3. Therefore, irrespective of a direction and an attitude of the surveying instrument 1, a tilt direction of the reference leg 8 with respect to a reference direction of the surveying instrument main body 4 and a tilt angle of the reference leg 8 with respect to the longitudinal axis 5 provided on the base module 3 do not change. Further, the attitude detector 25 which detects the tilts of the two axes with respect to the horizontality is provided to the surveying instrument main body 4.

Therefore, just installing the surveying instrument 1 in such a manner that the reference point R having the known three-dimensional coordinates coincides with the lower end of the reference leg 8, the arithmetic control module 23 enables acquiring a position of the machine reference point 11 with respect to the reference point R based on a known positional relationship between the lower end of the reference leg 8 and the machine reference point 11 and a detection result of the attitude detector 25.

Further, based on a detection result of the attitude detector 25, the lateral rotation angle detected by the lateral rotation angle encoder 16 and the longitudinal rotation angle detected by the longitudinal rotation angle encoder 21 can be converted into a horizontal angle and a vertical angle by the arithmetic control module 23, respectively. Therefore, the three-dimensional coordinates with reference to the reference point R of the predetermined object to be measured can be determined.

As described above, in the first embodiment, since a leveling work is not required at the time of installing the surveying instrument 1, an installation work can be facilitated, and a work time can be shortened.

Further, since the reference direction of the surveying instrument 1 is preset and the tilt direction of the reference leg 8 with respect to the reference direction is known, the surveying instrument 1 can be installed in an arbitrary direction as long as the lower end of the reference leg 8 coincides with the reference point R, and the workability can be improved.

Figure 3:
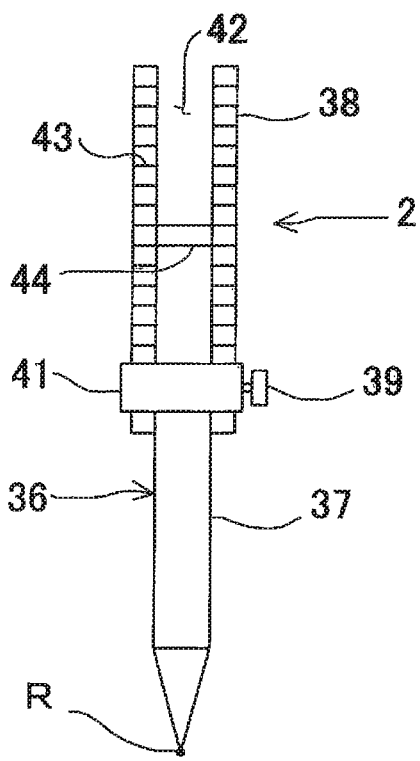
FIG. 3 is a primary part enlarged view showing a tripod of a surveying instrument according to a second embodiment of the present invention.

Next, by referring to FIG. 3, a description will be given on a second embodiment of the present invention. It is to be noted that, in the second embodiment, since the structure of the surveying instrument main body is the same as that in the surveying instrument main body of the first embodiment, a reference will be made to FIG. 2, and a detailed description of the surveying instrument main body will be omitted.

In the second embodiment, a reference leg 36 of a tripod 2 is expansible or contractible. The reference leg 36 has a rod-like leg portion 37 whose lower end has a sharp tip, a cylindrical holding portion 38 which slidably holds the leg portion 37, and a fixing portion 41 which is provided to the holding portion 38 and fixes a position of the leg portion 37 by fastening a screw 39 or by screwing the screw 39 into a screw hole (not shown) formed in the leg portion 37.

A slot 42 which is long in an axial direction is formed in the holding portion 38, and the scale 43 are formed on a sidewall of the slot 42 at the predetermined intervals, for instance. Further, a reference line 44 is formed at a predetermined position on a base end part of the leg portion 37.

When the leg portion 37 is slid with respect to the holding portion 38, a length of the reference leg 36 is adjusted. Further, when the reference leg 36 is expanded or contracted, a direction of the surveying instrument main body 4 (a direction of a sighting optical axis) changes. Further, via the slot 42, reading the scale 43 which coincides with the reference line 44 enables determining a length of the reference leg 36.

It is to be noted that the lengths of the reference leg 36 when the reference line 44 coincides with each scale 43 have been put into a database in advance, and stored in a storage module 24. Therefore, via an operation panel 22, just inputting a numerical value of the scale 43 which coincides with the reference line 44 makes an arithmetic control module 23 to acquire a length of the reference leg 36 and a distance between the lower end of the leg portion 37 and a machine reference point 11.

At the time of performing the measurement, in a state where the length of the reference leg 36 has been adjusted, the surveying instrument 1 is installed in such a manner that the lower end of the leg portion 37 coincides with the reference point R. A numerical value of the read scale 43 is input via the operation panel 22, the length of the reference leg 36 is acquired, and an object to be measured is subjected to the sighting and the distance measurement.

Since a direction of the surveying instrument main body 4 changes by the expansion or contraction of the reference leg 36, the arithmetic control module 23 calculates a direction of the surveying instrument main body 4 with respect to the reference direction based on the lateral rotation angle data, the longitudinal rotation angle data and the length of the reference leg 36 in the distance measurement. Further, a position (the three-dimensional coordinates) of the machine reference point 11 with respect to the reference point R is calculated based on the calculated direction.

Further, the arithmetic control module 23 corrects the three-dimensional coordinates of the machine reference point 11 based on a detection result of the attitude detector 25 in the distance measurement, and calculates the horizontal angle data and the vertical angle data based on the lateral rotation angle data, the longitudinal rotation angle data, and the length of the reference leg 36. Further, the arithmetic control module 23 calculates the three-dimensional coordinates of the object to be measured in a coordinate system of the reference point R based on a distance measurement result, the horizontal angle data, the vertical angle data, and the position of the machine reference point 11 with respect to the reference point R.

In the second embodiment, irrespective of a direction and an attitude of the surveying instrument main body 4, a tilt direction of the reference leg 36 with respect to the reference direction and a tilt angle of the reference leg 36 with respect to the longitudinal axis 5 do not change.

Further, a relationship between a positional relationship of each scale 43 and the reference line 44 and the length of the reference leg 36 is known. That is, in a state where the surveying instrument 1 is installed, the reference leg 36 and the base module 3 have a known relationship.

Therefore, since just installing the surveying instrument 1 in such a manner that the lower end of the leg portion 37 coincides with the reference point R, the arithmetic control module 23 enables acquiring a position of the machine reference point 11 with respect to the reference point R and determining the three-dimensional coordinates of the object to be measured, the leveling work is no longer necessary, the installation work can be facilitated, and a work time can be shortened.

It is to be noted that, in the second embodiment, the holding portion 38 is the cylindrical member which forms the slot 42. However, the holding portion 38 may have a U-shaped or C-shaped cross section. Further, a sensor which detects a position of the reference line 44 may be provided to the holding portion 38 so that a length of the reference leg 36 can be automatically detected based on a detection result of the sensor.

Figure 4:
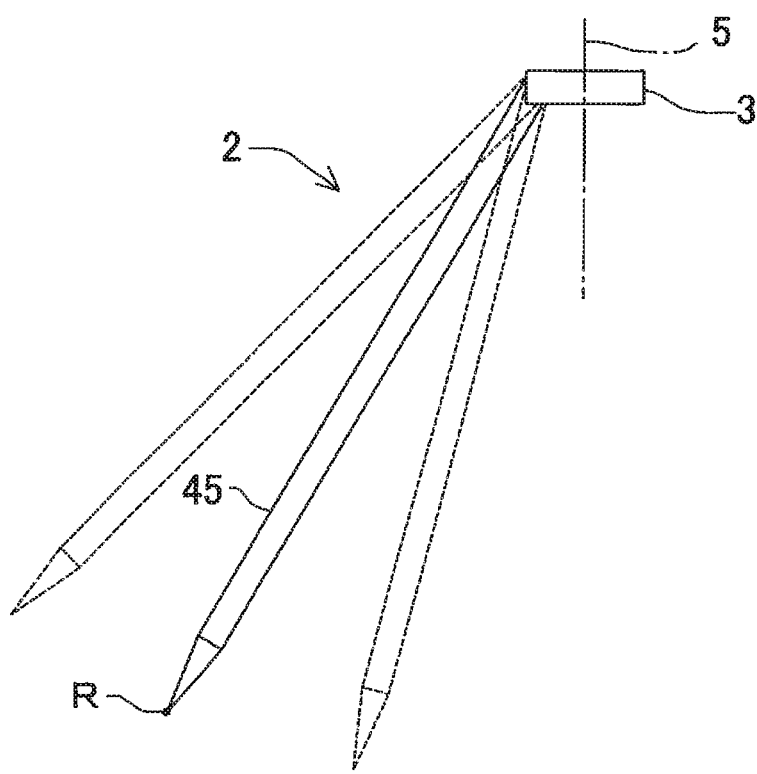
FIG. 4 is an explanatory drawing showing a tripod of a surveying instrument according to a third embodiment of the present invention.

Next, by referring to FIG. 4, a description will be given on a third embodiment of the present invention. It is to be noted that, in the third embodiment, since the structure of a surveying instrument main body is the same as that in the surveying instrument main body of the first embodiment, a reference will be made to FIG. 2, and a detailed description of the surveying instrument main body will be omitted.

In the third embodiment, a reference leg 45 of a tripod 2 is tiltable. The reference leg 45 is tiltable with respect to a base module 3 in a radial direction with a base end portion as a center, and a tilt angle with respect to a longitudinal axis 5 can be gradually changed. That is, the reference leg 45 can be fixed with respect to the longitudinal axis 5 at a predetermined tilt angle. For instance, in the third embodiment, the tilt angle of the reference leg 45 can be changed on three levels which are 15°, 30° and 45° with respect to the longitudinal axis 5. As a method for fixing the reference leg 45 at a predetermined tilt angle, various means such as the fitting can be applied.

It is to be noted that a distance between a lower end of the reference leg 45 and a machine reference point 11 at the time of fixing the reference leg 45 at a predetermined angle has been put into a database in advance and stored in a storage module 24. Therefore, just inputting a tilt angle of the reference leg 45 via the operation panel 22 makes an arithmetic control module 23 to acquire the distance between the lower end of the reference leg 45 and the machine reference point 11.

At the time of performing the measurement, in a state where a tilt angle of the reference leg 45 has been adjusted, the surveying instrument 1 is installed in such a manner that the lower end of the reference leg 45 coincides with a reference point R. Further, the tilt angle of the reference leg 45 is input via the operation panel, and the arithmetic control module 23 performs the sighting and the distance measurement of an object to be measured.

A tilt direction of the reference leg 45 with respect to a reference direction is known in advance and the tilt angle of the reference leg 45 with respect to the longitudinal axis 5 is also known. Therefore, a direction of the surveying instrument main body 4 with respect to the reference direction is calculated by the arithmetic control module 23 based on the lateral rotation angle data and the longitudinal rotation angle data in the distance measurement. Further, a position (the three-dimensional coordinates) of the machine reference point 11 with respect to the reference point R is calculated by the arithmetic control module 23 based on the calculated direction.

Further, the arithmetic control module 23 corrects the three-dimensional coordinates of the machine reference point 11 based on a detection result of an attitude detector 25 in the distance measurement, and converts the lateral rotation angle data and the longitudinal rotation angle data into the horizontal angle data and the vertical angle data. Further, the arithmetic control module 23 calculates the three-dimensional coordinates of the object to be measured in a coordinate system of the reference point R based on the distance measurement result, the horizontal angle data, the vertical angle data, and the position of the machine reference point 11 with respect to the reference point R.

In the third embodiment, the tilt direction of the reference leg 45 with respect to the reference direction does not change irrespective of a direction or an attitude of the surveying instrument main body 4, and the tilt angle of the reference leg 45 with respect to the longitudinal axis 5 is known. That is, in a state where the surveying instrument 1 is installed, the reference leg 45 and the base module 3 have a known relationship.

Therefore, since just installing the surveying instrument 1 in such a manner that the lower end of the reference leg 45 coincides with the reference point R, the arithmetic control module 23 enables acquiring the position of the machine reference point 11 with respect to the reference point R and measuring the three-dimensional coordinates of the object to be measured, the leveling work is no longer necessary, the installation work can be facilitated, and a work time can be shortened.

It is to be noted that, in the third embodiment, the tilt angle of the reference leg 45 with respect to the longitudinal axis 5 can be changed on three levels. On the other hand, the tilt angle of the reference leg 45 may be changeable on two levels, or it may be changeable on four or more levels.

Further, the reference leg 45 may be tiltable with respect to the longitudinal axis 5, and a sensor which detects a tilt angle (an opening degree) of the reference leg 45 may be provided so that a tilt angle of the sensor can be automatically detected.

It is to be noted that, needless to say, the second embodiment can be combined with the third embodiment so that the reference leg 45 is configured expansible/contractible and tiltable.

It is to be noted that, in the first embodiment to the third embodiment, the reference leg and the base module 3 have a known relationship, the attitude detector 25 is provided, and the leveling work is omitted. On the other hand, a leveling module may be additionally provided. In a case where the leveling module is provided, the three-dimensional coordinates of the machine reference point 11 with reference to the reference point R can be calculated by the arithmetic control module 23 based on a positional relationship between the lower end of the reference leg and the machine reference point 11 and a leveling amount. Therefore, even in this case, since the installation work for positioning the machine reference point 11 on the reference point R can be omitted, a work time can be shortened, and the attitude detector 25 can be omitted.

Figure 5:
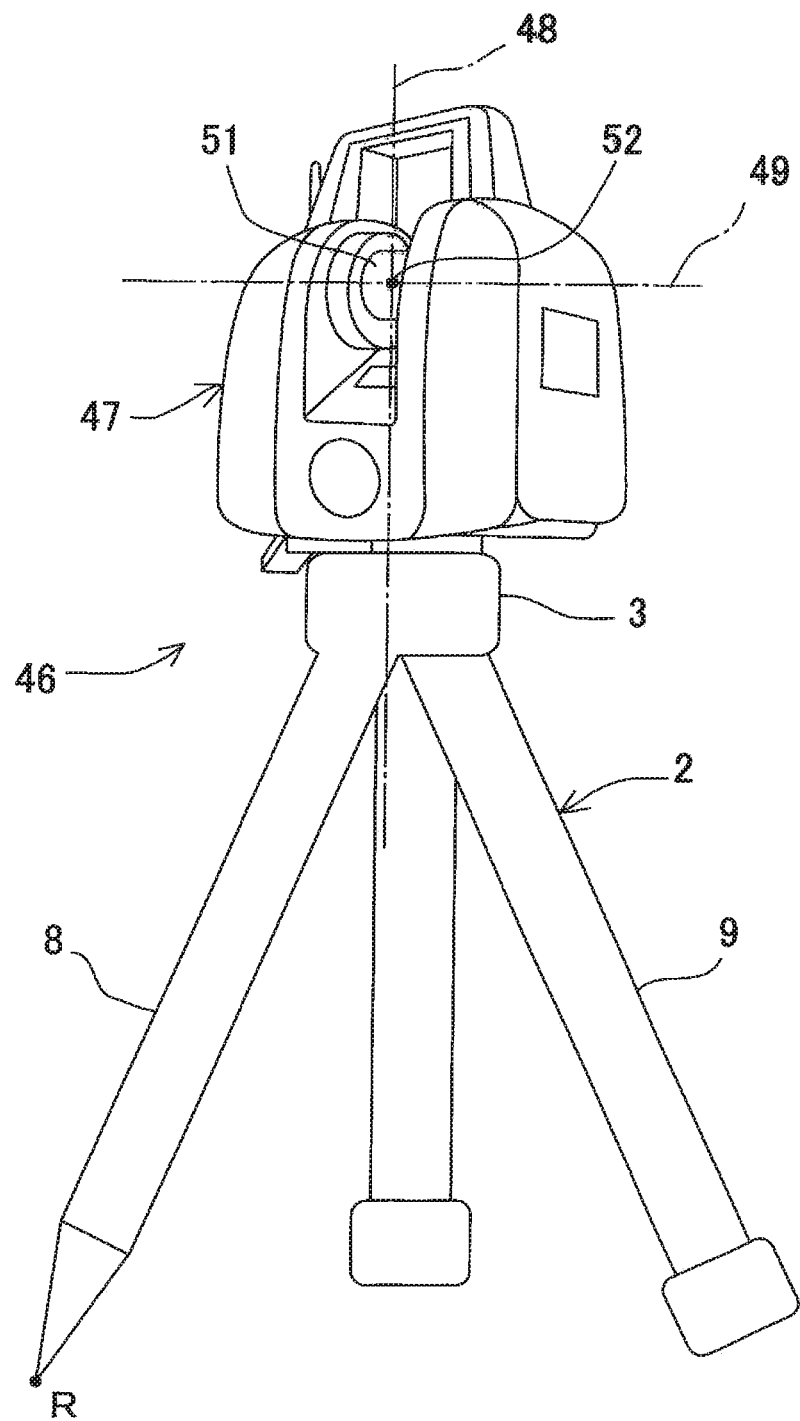
FIG. 5 is a perspective view showing another surveying instrument applied to the embodiments of the present invention.

Further, in the first embodiment to the third embodiment, the total station has been exemplified as the surveying instrument. On the other hand, a surveying instrument other than the total station may be used as long as the surveying instrument includes an attitude detector which can detect a tilt angle and a tilt direction with respect to the horizontality. For instance, FIG. 5 shows a case where a laser scanner is used as a surveying instrument 46. It is to be noted that the configuration of the tripod 2 is the same as that in the first embodiment.

The surveying instrument 46 has a surveying instrument main body 47 provided on the base module 3. The surveying instrument main body 47 is provided on the base module 3 in such a manner that the surveying instrument main body 47 can laterally rotate around a longitudinal axis 48, and a scanning mirror 51 which can longitudinally rotate around a lateral axis 49 is provided in the surveying instrument main body 47.

A machine reference point 52 which is a machine center of the surveying instrument main body 47 is placed at, for instance, an intersection of the longitudinal axis 48 and the lateral axis 49. A positional relationship (a distance) between a lower end of the reference leg 8 and the machine reference point 52 is known. That is, in a case where an arbitrary direction is set as a reference direction of the surveying instrument 46, a tilt direction of the reference leg 8 with respect to the reference direction, a tilt angle of the reference leg 8 with respect to the longitudinal axis 48, and a distance between a lower end of the reference leg 8 and the machine reference point 52 are known.

As described above, even in case of the surveying instrument 46, irrespective of an attitude and a direction of the surveying instrument main body 47, a position (the three-dimensional coordinates) of the machine reference point 52 with respect to the lower end of the reference leg 8 are known. Therefore, just installing the surveying instrument 46 in such a manner that the lower end of the reference leg 8 can coincide with a reference point R having the known three-dimensional coordinates, the arithmetic control module enables calculating the three-dimensional coordinates of the machine reference point 52 in a coordinate system of the reference point R.

Further, based on a detection result of the attitude detector, a lateral rotation angle and a longitudinal rotation angle can be converted into a horizontal rotation angle and a vertical rotation angle, and the coordinates of the machine reference point 52 can be corrected. Therefore, an object to be measured can be measured without performing the leveling work of the surveying instrument 46.

Figure 6:
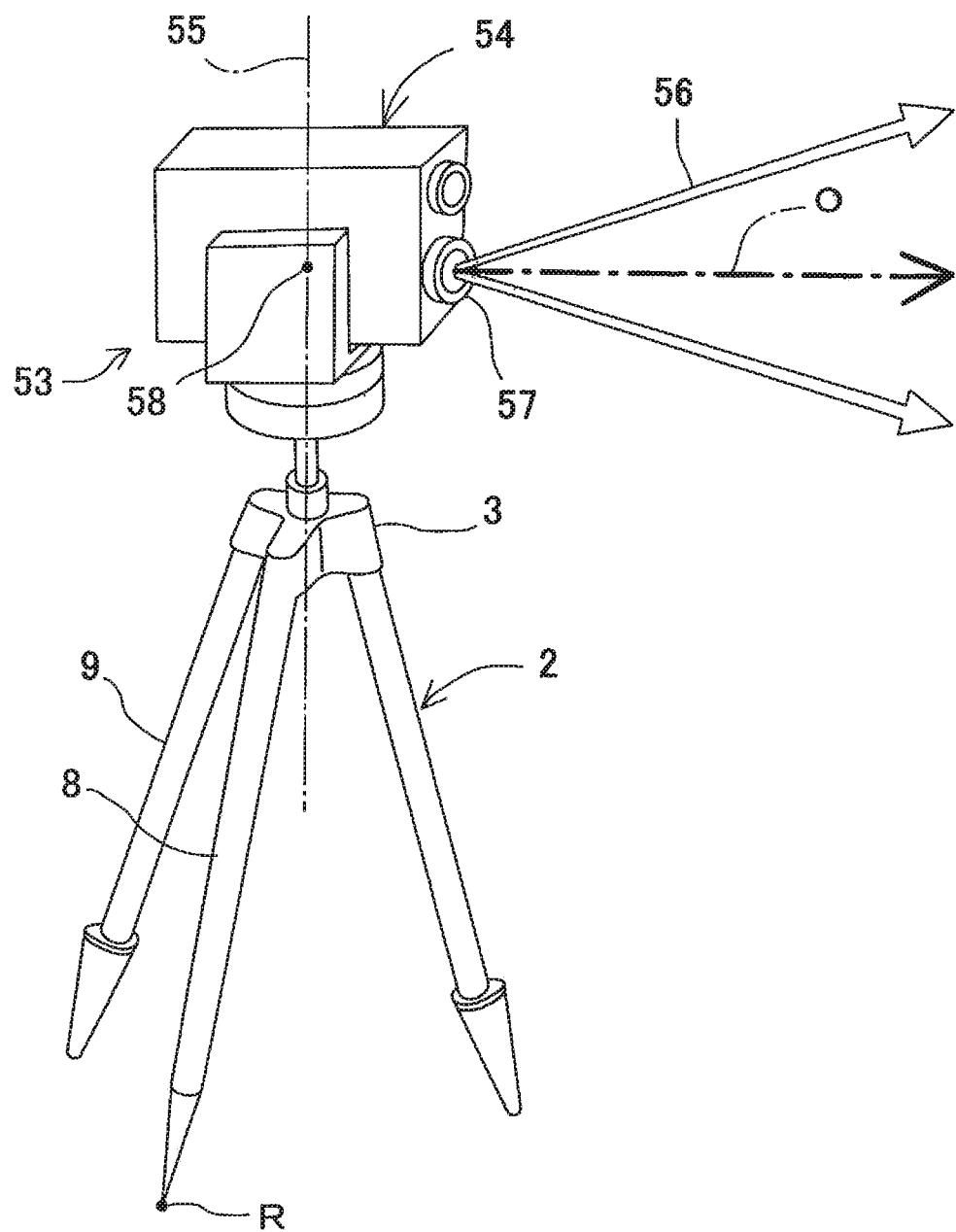
FIG. 6 is a perspective view showing still another surveying instrument applied to the embodiments of the present invention.

Further, FIG. 6 shows a case where a two-dimensional laser scanner disclosed in Japanese Patent Application Publication No. 2017-106813 is used as a surveying instrument 53. It is to be noted that the configuration of the tripod 2 is the same as that in the first embodiment.

The surveying instrument 53 has a surveying instrument main body 54 provided on the base module 3. The surveying instrument main body 54 is provided on the base module 3 so that it can laterally rotate around a longitudinal axis 55, and an optical axis deflector 57 which deflects an optical axis of the distance measuring light (a distance measuring optical axis) 56 is provided in the surveying instrument main body 54. It is to be noted that, in a state where the optical axis deflector 57 does not deflect the distance measuring optical axis 56, the distance measuring optical axis 56 coincides with a reference optical axis O.

A machine reference point 58 which is a machine center of the surveying instrument main body 54 is placed at, for instance, an intersection of the longitudinal axis 55 and the reference optical axis O. A positional relationship (a distance) between a lower end of the reference leg 8 and the machine reference point 58 is known. That is, in a case where an arbitrary direction is set as a reference direction of the surveying instrument main body 54, a tilt direction of the reference leg 8 with respect to the reference direction, a tilt angle of the reference leg 8 with respect to the longitudinal axis 55 and the distance between the lower end of the reference leg 8 and the machine reference point 58 are known.

As described above, in case of the surveying instrument 53, a position (the three-dimensional coordinates) of the machine reference point 58 with respect to the lower end of the reference leg 8 is likewise known irrespective of an attitude and a direction of the surveying instrument main body 54. Therefore, just installing the surveying instrument 53 in such a manner that the lower end of the reference leg 8 coincides with a reference point R having the known three-dimensional coordinates, the arithmetic control module enables calculating the three-dimensional coordinates of the machine reference point 58 in a coordinate system of the reference point R.

Further, based on a detection result of an attitude detector, since a lateral rotation angle can be converted into a horizontal rotation angle, a position of the machine reference point 58 can be corrected, and an object to be measured can be measured without performing a leveling work.

It is to be noted that all the surveying instruments illustrated in the first embodiment to the third embodiment and in FIG. 5 and FIG. 6 have the machine reference points placed on the longitudinal axis respectively. However, the machine reference point does not have been placed on the longitudinal axis. For instance, the machine reference point may be placed at a position offset from the longitudinal axis.

In this case, when an offset amount (an offset distance) with respect to the longitudinal axis and an offset direction with respect to a reference direction of the surveying instrument main body are known, a position of the machine reference point with respect to the lower end of the reference leg can be acquired based on a tilt direction of the reference leg with respect to the reference direction, a tilt angle of the reference leg with respect to the longitudinal axis, an offset direction of the machine reference point with respect to the reference direction, an offset amount of the machine reference point with respect to the longitudinal axis and a distance between the lower end of the reference leg and the machine reference point.

The invention claimed is:

1. A surveying instrument comprising a tripod which is installed on an installation surface and a surveying instrument main body which is provided on said tripod and laterally rotatable around a longitudinal axis, wherein said tripod includes a base module, a reference leg which is integral with said base module and has a known relationship between a lower end of said reference leg and a machine reference point which is a machine center of said surveying instrument main body, and two auxiliary legs, wherein said surveying instrument main body includes a distance measuring module configured to measure a distance to an object to be measured, a lateral rotation angle detector configured to detect a lateral rotation angle of said surveying instrument main body, and an arithmetic control module, said reference leg is installed in such a manner that a lower end of said reference leg coincides with a reference point, and said arithmetic control module configured to calculate a position of said machine reference point with respect to said reference point based on said positional relationship between said lower end of said reference leg and said machine reference point.

2. The surveying instrument according to claim 1, wherein said auxiliary legs are tiltable or expansible/contractible with respect to said base module.

3. The surveying instrument according to claim 2, wherein an arbitrary reference direction is configured to set to said surveying instrument main body, and a tilt direction of said reference leg with respect to said reference direction and a tilt angle of said reference leg with respect to said longitudinal axis are known.

4. The surveying instrument according to claim 3, wherein said surveying instrument main body further comprises an attitude detector, and said arithmetic control module configured to correct a position of said machine reference point with respect to said reference point based on a detection result of said attitude detector.

5. The surveying instrument according to claim 4, wherein said distance measuring module is longitudinally rotatable around a lateral axis, and said surveying instrument main body further comprises a longitudinal rotation angle detector configured to detect a longitudinal rotation angle of said distance measuring module.

6. The surveying instrument according to claim 2, wherein said surveying instrument main body further comprises an attitude detector, and said arithmetic control module configured to correct a position of said machine reference point with respect to said reference point based on a detection result of said attitude detector.

7. The surveying instrument according to claim 1, wherein an arbitrary reference direction is configured to set to said surveying instrument main body, and a tilt direction of said reference leg with respect to said reference direction and a tilt angle of said reference leg with respect to said longitudinal axis are known.

8. The surveying instrument according to claim 7, wherein said surveying instrument main body further comprises an attitude detector, and said arithmetic control module configured to correct a position of said machine reference point with respect to said reference point based on a detection result of said attitude detector.

9. The surveying instrument according to claim 1, wherein said surveying instrument main body further comprises an attitude detector, and said arithmetic control module configured to correct a position of said machine reference point with respect to said reference point based on a detection result of said attitude detector.

10. The surveying instrument according to claim 9, wherein said reference leg comprises a rod-like leg portion, a holding portion which slidably holds said leg portion, and a fixing portion which fixes said leg portion to said holding portion at a predetermined position, a reference line is formed on said leg portion, the scale are formed on said holding portion at the predetermined intervals, and a length of said reference leg when said reference line coincides with each scale is known.

11. The surveying instrument according to claim 10, wherein said distance measuring module is longitudinally rotatable around a lateral axis, and said surveying instrument main body further comprises a longitudinal rotation angle detector configured to detect a longitudinal rotation angle of said distance measuring module.

12. The surveying instrument according to claim 9, wherein said reference leg is tiltable in a radial direction with a base end portion as a center and fixable at a predetermined tilt angle with respect to said base module.

13. The surveying instrument according to claim 12, wherein said distance measuring module is longitudinally rotatable around a lateral axis, and said surveying instrument main body further comprises a longitudinal rotation angle detector configured to detect a longitudinal rotation angle of said distance measuring module.

14. The surveying instrument according to claim 9, wherein said distance measuring module is longitudinally rotatable around a lateral axis, and said surveying instrument main body further comprises a longitudinal rotation angle detector configured to detect a longitudinal rotation angle of said distance measuring module.

15. The surveying instrument according to claim 14, wherein said arithmetic control module configured to convert a lateral rotation angle detected by said lateral rotation angle detector and a longitudinal rotation angle detected by said longitudinal rotation angle detector into a horizontal angle and a vertical angle based on a detection result of said attitude detector, respectively.

* * * * *